United States Patent [19]

DeVoss et al.

[11] Patent Number: 5,286,076
[45] Date of Patent: Feb. 15, 1994

[54] SEAT SLIDE DEVICE

[75] Inventors: Cathy A. DeVoss, Dearborn; Richard F. Johnson, Bloomfield Hills, both of Mich.

[73] Assignee: Douglas & Lomason Company, Farmington Hills, Mich.

[21] Appl. No.: 980,994

[22] Filed: Nov. 24, 1992

[51] Int. Cl.⁵ .............................................. B60N 1/08
[52] U.S. Cl. ................... 296/65.1; 248/429; 248/430; 297/423.38
[58] Field of Search ............ 296/65.1; 248/429, 430; 297/437

[56] References Cited

U.S. PATENT DOCUMENTS

| | | | |
|---|---|---|---|
| 2,277,947 | 3/1942 | Bailey | 308/3 |
| 3,479,099 | 11/1969 | Krause | 308/3 |
| 4,089,500 | 5/1978 | Gustafsson | 248/429 |
| 4,262,963 | 4/1981 | Bauer | 297/473 |
| 4,527,767 | 7/1985 | Rees | 248/419 |
| 4,556,186 | 12/1985 | Langmesser, Jr. | 248/429 |
| 4,695,097 | 9/1987 | Muraishi | 297/452 |
| 4,717,194 | 1/1988 | Ota et al. | 296/65.1 |
| 4,756,503 | 7/1988 | Fujita | 248/430 |
| 4,775,126 | 10/1988 | Yokoyama | 248/430 |
| 4,940,285 | 7/1990 | Suzuki et al. | 297/473 |
| 4,961,559 | 10/1990 | Raymor | 248/429 |
| 4,964,608 | 10/1990 | Rogala et al. | 248/429 |

*Primary Examiner*—Robert R. Song
*Attorney, Agent, or Firm*—Harness, Dickey & Pierce

[57] ABSTRACT

An interlocking track arrangement for a seat slide device of the type used in manually-operable vehicle seat slide mechanisms is disclosed. The seat slide device also includes a latching arrangement having a lock plate fixed to a lower track and a latch plate supported from an upper track for rectilinear movement along a vertical plane. The latch plate has a plurality of locking teeth each having a segmented toothform defined by a first locking portion for facilitating initial receipt within a locking aperture formed in the lock plate, a second locking portion for facilitating complete interdigitated engagement therebetween, and a camming portion providing a ramped transition between the first and second locking portions. The rectilinear movement of the latch plate along the vertical plane provides improved operation and reliability.

25 Claims, 5 Drawing Sheets

SEAT SLIDE DEVICE

BACKGROUND OF THE INVENTION

The present invention relates generally to automotive vehicle seating and, more particularly, to a seat slide device of the type used in manually-operated seat adjustment mechanisms.

Virtually all modern motor vehicles are equipped with seating systems that can be selectively adjusted for providing increased comfort and convenience to the seat occupants. In many manually-actuated systems, the seat is supported for movement on a seat adjustment mechanism that can be selectively actuated for permitting the seat occupant to adjust the horizontal (i.e., "fore" and "aft") position of the seat. Typically, the seat adjustment mechanism includes a pair of laterally-spaced seat slide devices each having a lower track fixed to the vehicle's floor structure, an upper track fixed to the seat and which is supported for sliding movement on the lower track, and a manually-operable latching mechanism for releasably latching the upper track (and seat) in the desired adjusted position relative to the lower track. In addition, a common handle or linkage assembly is also generally provided for causing synchronous actuation of each of the latching mechanisms associated with the laterally-spaced seat slide devices to inhibit lateral (i.e., side-to-side) misalignment of the seat.

Commonly, the latching mechanisms incorporated into conventional seat slide devices include a lock plate attached to the stationary lower track and a latch plate supported from the upper track for pivotable movement between a "locked" position of engagement with the lock plate and a "released" position of disengagement therewith. Typically, a plurality of locking projections (i.e., teeth, hooks, tabs, etc.) are formed on one of the latch plate and the lock plate for interdigitated engagement with a series of locking apertures formed on the other of the plates in response to movement of the latch plate to the "locked" position. The manually-operable handle assembly permits the seat occupant to pivot the latch plate to the "released" position when it is desired to adjust the horizontal position of the seat. In addition, the latching mechanisms are spring-biased for normally urging the latch plate toward the "locked" position.

In an effort to inhibit separation (i.e., "peeling") of the upper track from the lower track during collisions and other heavily-loaded conditions, it is known to structurally "interlock" the upper track on the lower track. Such an arrangement is disclosed in U.S. Pat. No. 4,957,267 to Terai wherein the inwardly-turned vertical flanges formed on the opposite lateral edges of the upper track are nested within longitudinal channels formed by outwardly-turned vertical flanges on the lower track. To permit sliding movement and minimize lateral "play", a plurality of balls are rotatably disposed above the longitudinal channels and between a horizontal surface portion of the upper track and a horizontal portion of the outwardly-turned flanges on the lower track. A similar interlocking track arrangement is shown in U.S. Pat. No. 4,487,459 to Rees with the exception that plastic slides are substituted for the balls. However, while most conventional seat slide devices work satisfactory for their intended purpose, they are typically complex in design and construction and expensive to manufacture.

SUMMARY OF THE INVENTION

Accordingly, it is an object of the present invention to provide an improved seat slide device that is relatively simple in design and construction, inexpensive to fabricate and assemble, and yet is durable and highly reliable.

A more detailed object of the present invention is to provide a seat slide device with an interlockingly interfitted track arrangement having high load-bearing capabilities for inhibiting "peeling" of the upper tracks under highly loaded conditions. Retainer assemblies are operably disposed between the interlockingly interfitted tracks for causing smooth sliding movement, inhibiting lateral (i.e., "side-to-side") play and transferring vertically-directed (i.e., "peel") loads from the seat and upper tracks into the lower track and the vehicle's reinforced sill and/or floor structure.

A further object of the present invention is to provide a seat slide device with an improved latching mechanism for permitting the seat occupant to manually adjust the longitudinal position of the seat. More specifically, the latching mechanism includes a latch plate supported from the upper track for selective rectilinear movement along a vertical plane between positions of "locked" engagement and "released" disengagement relative to a lock plate fixed to the lower track. Moreover, the latch plate includes a plurality of locking projections that are adapted to move into and out of interdigitated engagement with a series of locking apertures formed in the lock plate. The locking projections have a segmented toothform that includes camming means for facilitating complete interdigitation following initial engagement of the locking projections within the locking apertures. The segmented tooth form includes a first locking portion for facilitating initial receipt within the locking apertures, a second locking portion for causing complete interdigitated engagement, and a camming portion for providing a ramped transition between the first and second locking portions. Thus, the first locking portion defines an "anti-ratchet" engagement position and the second locking portions defines an "anti-chucking" engagement position.

According to yet another object of the present invention, the improved latching mechanism can be installed on the seat slide device as a sub-assembly to further reduce system cost and complexity.

From the following specification taken in conjunction with the accompanying drawings and appended claims, other objects, features and advantages of the present invention will become apparent to those skilled in the art.

DETAILED DESCRIPTION OF THE PREFERRED EMBODIMENT

Figure 1:
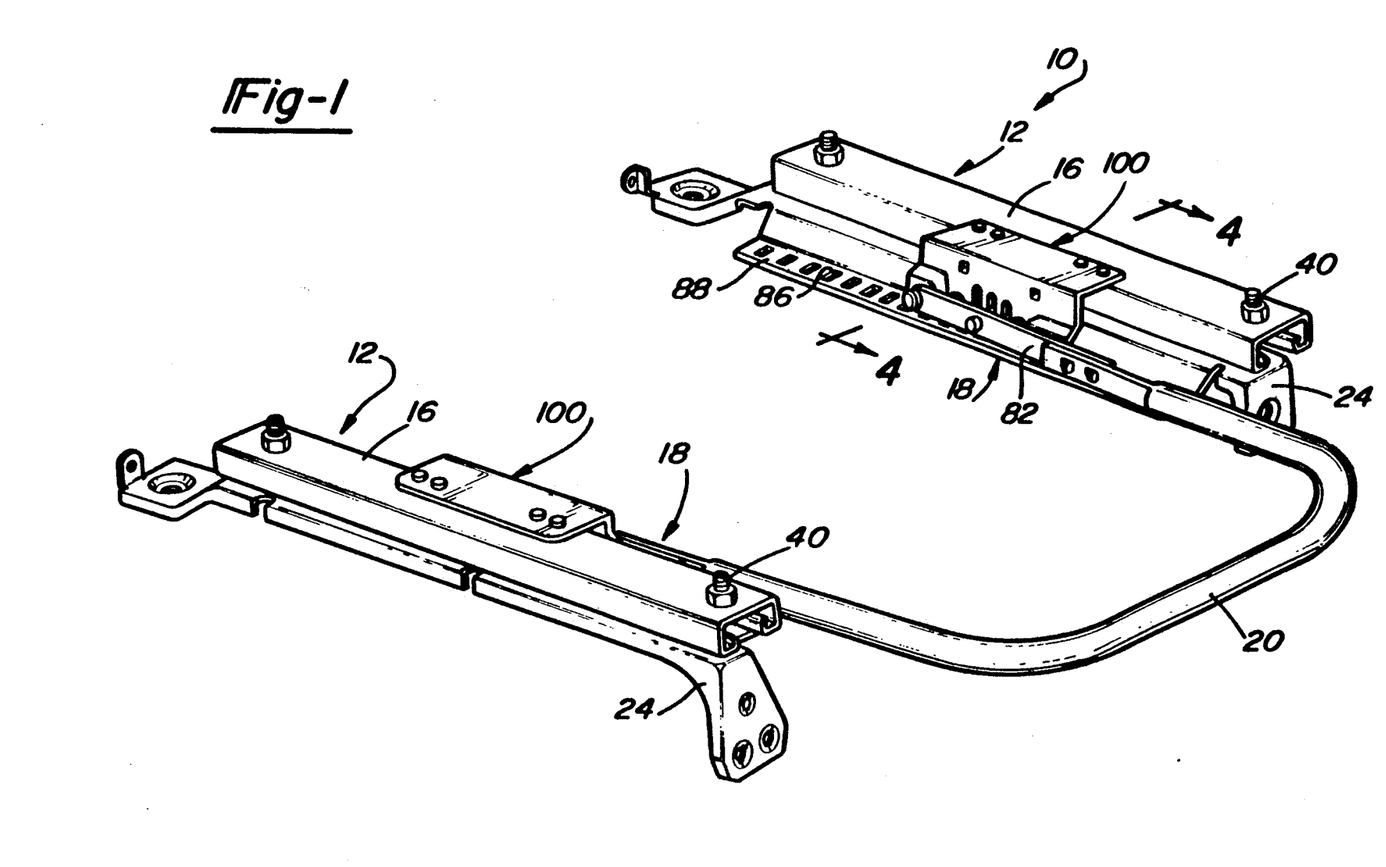
FIG. 1 is a perspective view of a manual seat adjustment mechanism having a pair of laterally-spaced seat slide devices incorporating an interlocking track arrangement and a vertical latching mechanism of the present invention.
Figure 2:
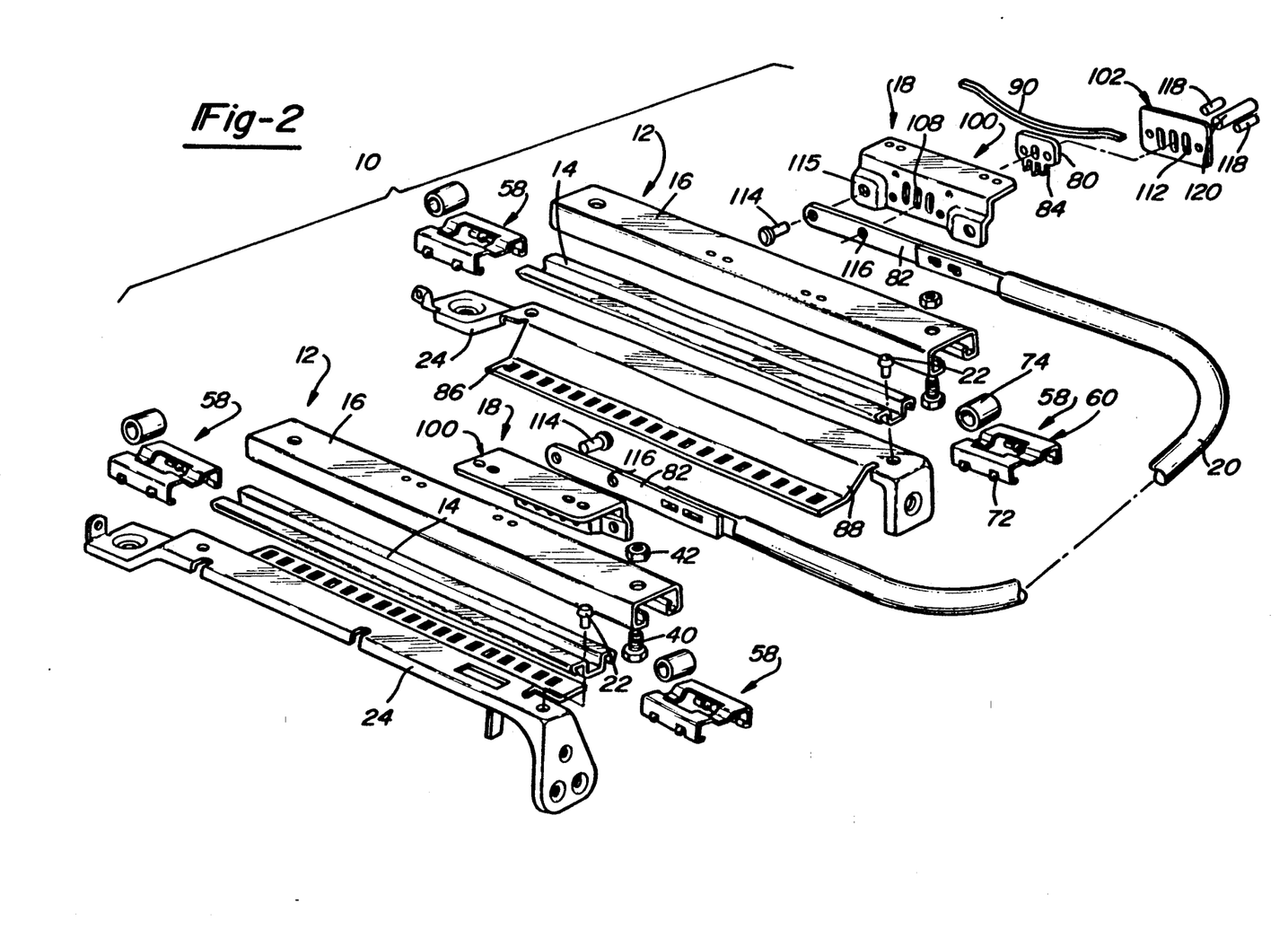
FIG. 2 is an exploded perspective view of the manual seat adjustment mechanism shown in FIG. 1.

According to the drawings, and particularly FIGS. 1 and 2, an exemplary manual seat adjustment mechanism 10 is shown. In general, manual seat adjustment mechanism 10 is of the type commonly referred to as a "two-way" adjuster that is adapted to permit a seat occupant to selectively adjust the longitudinal (i.e., "fore" and "aft") position of a seat. To provide means for such longitudinal adjustment, seat adjustment mechanism 10 includes a pair of laterally-spaced seat slide devices 12 which each include a lower track 14 and an upper track 16. A pair of manually-operable latching mechanisms 18 are also provided and which are operably coupled by handle means 20 for permitting synchronous actuation thereof. Thus, selective actuation of latching mechanisms 18 permit upper tracks 16 to slide longitudinally with respect to lower tracks 14.

Lower tracks 14 are elongated structural members that are secured via suitable fasteners 22 to mounting brackets 24 which, in turn, are secured to the vehicle's reinforced sill and/or floor structure. As best seen from FIGS. 3 and 4, lower tracks 14 are each configured to include a central U-shaped portion having a planar base segment 26 and a pair of laterally-spaced vertical legs or side walls 28 extending therefrom. Formed at the distal end of each side wall 28 is an outwardly-bent lip or flange 30 which defines an elongated slide channel 32. Preferably, each flange 30 includes an outwardly extending horizontal segment 34, a downwardly extending vertical segment 36, and an inwardly angulated end segment 38. As noted, each upper track 16 is slidably mounted on its respective lower track 14 for relative movement in the fore and aft directions. Seat mounting fasteners, such as threaded studs 40 and nuts 42, are secured to upper tracks 16 and are adapted to be secured to a reinforced seat pan section of the seat. In this manner, the seat is mounted for sliding movement with upper tracks 16 on lower tracks 14.

Figure 3:
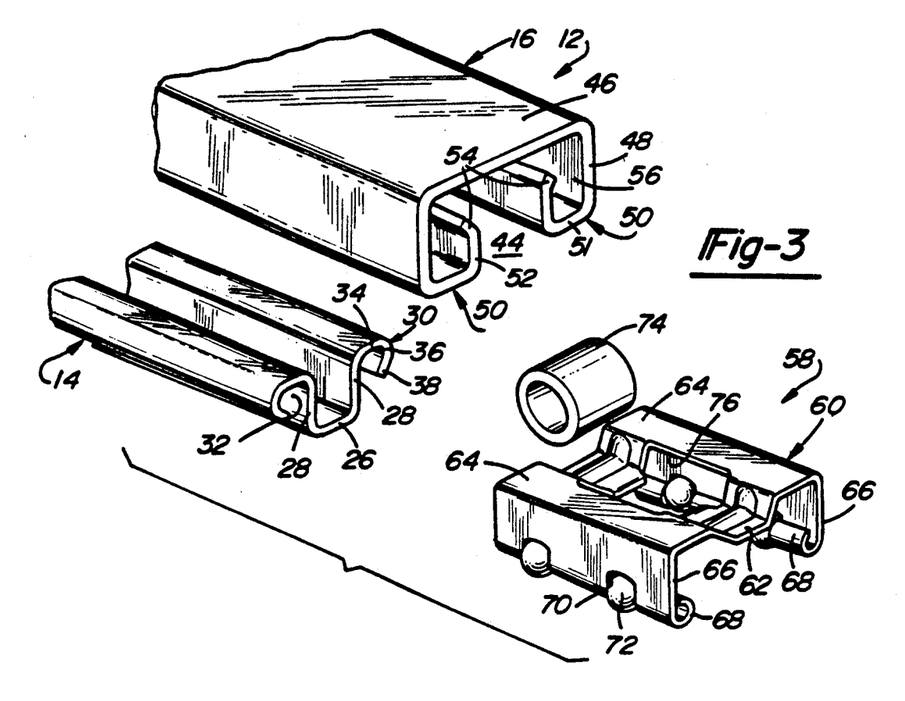
FIG. 3 is a partial exploded view of the interlocking track structure associated with the seat slide devices of the present invention.
Figure 4:
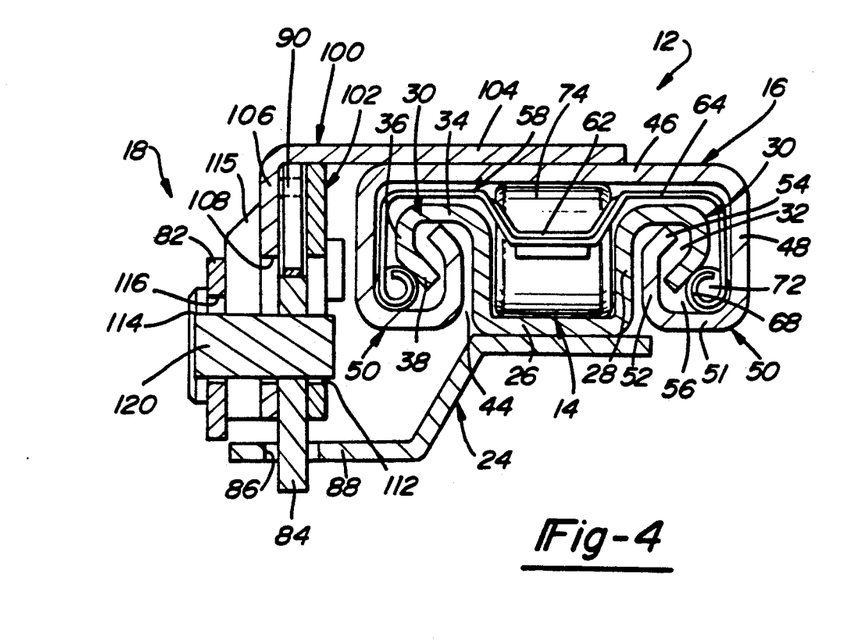
FIG. 4 is a sectional view taken along line 4—4 of FIG. 1 showing the latching mechanism and interlocking track arrangement in greater detail.
Figure 5:
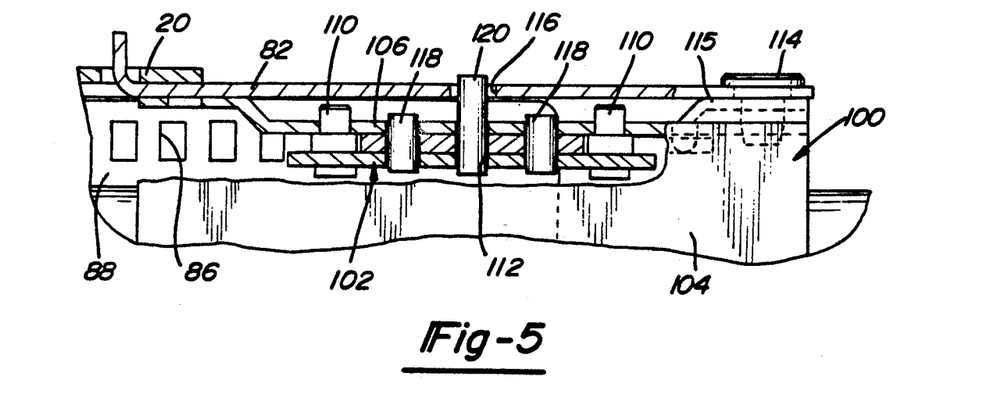
FIG. 5 is a plan view, partially broken-away, showing the latching mechanism.

With particular reference to FIGS. 2 through 4, upper tracks 16 are shown as elongated structural members having a generally rectangular shape in cross-section with a central channel 44 formed along its bottom edge for enabling the U-shaped portion of lower tracks 14 to be slidably positioned therein. More specifically, each upper track 16 has a planar upper horizontal segment 46 which overlies the entire lateral width of lower track 14, and vertical side walls 48 which extend downwardly from opposite lateral edges of horizontal segment 46. Inwardly-bent lips or flanges 50 are formed at the lower end of side walls 48 and each includes a planar inwardly-extending horizontal segment 51, an upwardly-extending vertical segment 52 and an outwardly angulated end segment 54. As best seen from FIG. 4, central channel 44 is defined between the laterally-spaced vertical segments 52 while a portion of each vertical segment 52 and angulated end segment 54 is slidably disposed within one of slide channels 32 of lower track 14. Moreover, upper segment 46, vertical side walls 48 and inwardly-bent flanges 50 define a second set of elongated slide channels 56 within which outwardly-bent flanges 30 of lower track 14 are slidably retained. Thus, upper track 16 is "interlockingly" interfitted on lower track 14 in a manner which facilitates the transfer of vertically-directed (i.e., "peel") loads to the vehicle's reinforced sill and/or floor structure. Moreover, the interlockingly interfitted track arrangement of the present invention is designed to "fold-in" on itself upon exertion of heavy "peel" loading thereon to augment resistance to separation of upper tracks 16 from lower tracks 14.

A pair of retainer assemblies 58 are interposed between each set of interfitted upper tracks 16 and lower tracks 14 for enabling smooth sliding movement of upper tracks 16 on lower tracks 14 along a substantially horizontal plane. Retainer assemblies 58 are shown to include a unitary retainer body 60 having a central recessed portion 62 and a pair of raised planar horizontal surfaces 64 adjacent to recessed portion 62 which, in turn, are each joined to a down-turned portion 66. When installed between the interfitted tracks, raised planar surfaces 64 are interposed between upper horizontal segment 46 of upper track 18 and horizontal segments 34 of outwardly-bent flanges 30 on lower tracks 14. Furthermore, the distal ends of down-turned portions 66 are inwardly rolled-over to form generally cylindrical lips 68 each having a pair of longitudinally-spaced openings 70 formed therein within which ball bearings 72 are rotatably retained. More specifically, ball bearings 72 are entrapped within cylindrical lips 68 for rolling movement in the longitudinal guideways formed between an outer surface of angulated end segments 38 of lower tracks 14 and the arcuate surface formed at the internal intersection of side walls 48 and lower horizontal segments 51 of upper tracks 16. Thus, ball bearings 72 are arranged in rolling engagement with each of the interlocked tracks to minimize deflection therebetween while transferring the upwardly-directed vertical (i.e., "peel") loads from upper tracks 16 to lower tracks 14 and, in turn, to the vehicle's reinforced sill and/or floor structure. In addition, a cylindrical roller 74 is retained within a central cut-out portion 76 of retainer body 60 so as to provide smooth sliding movement while transferring downwardly-directed vertical loads from upper tracks 16 into lower tracks 14.

As noted, each of the manually-operable latching mechanisms 18 can be synchronously actuated for permitting fore and aft sliding movement of upper tracks 16 (and the seat) on lower tracks 14. In general, each latching mechanism 18 is a spring-biased arrangement that can be readily associated with a seat slide device. More particularly, latch mechanisms 18 are constructed to include a latching component that moves rectilinearly along a vertical plane for overcoming problems commonly associated with conventional swing-type latching systems. As will be understood, left and right latching mechanisms 18 are identical or mirror-image equivalents that are compact in construction and which can be pre-assembled as a sub-assembly for easy installation into slide devices 12.

Figure 6:
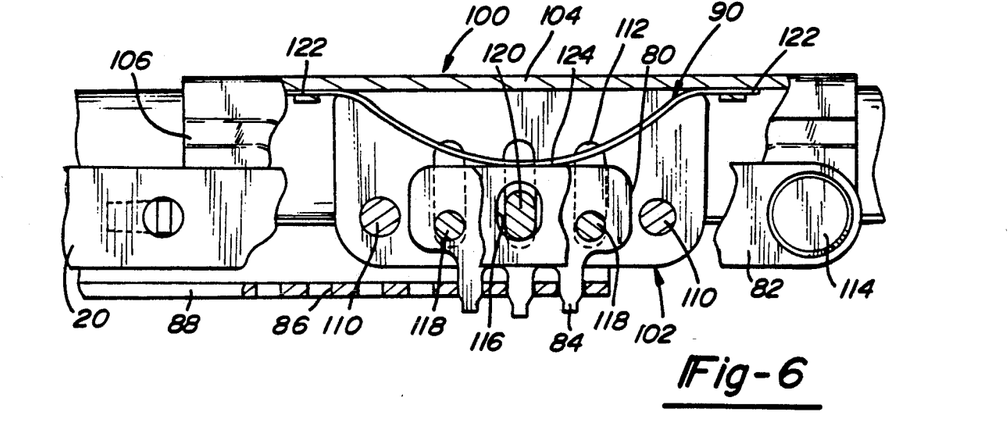
FIG. 6 is a side view, with components removed or partially fragmented, showing the latching mechanism in a "locked" position.
Figure 7:
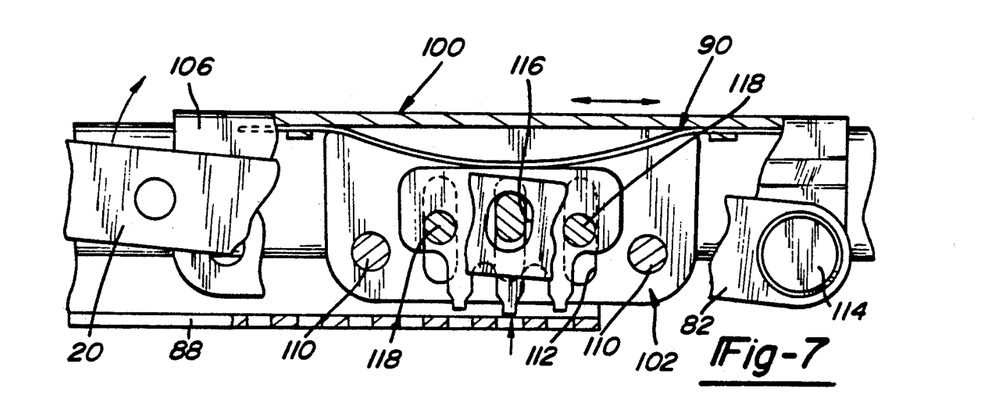
FIG. 7 is a side view, similar to FIG. 6, showing the latching mechanism in a "released" position.

As shown, each latch mechanism 18 includes a latch plate 80 that is operably coupled to a linkage member 82 of handle 20 such that upward movement of handle 20 causes latch plates 80 to move linearly along a vertical plane from the "locked" position of FIG. 6 to the "released" position shown in FIG. 7. In the "released" position, a series of locking projections or teeth 84 formed on latch plate 80 are disengaged from a series of locking apertures 86 that are formed along an inner longitudinal edge surface of a lock plate 88 that is fixed to, or integral with, support member 24. A spring member, such as leaf spring 90, is adapted to bias latch plate 80, linkage 82 and handle 20 in a downward direction such that locking teeth 84 are normally biased toward the "locked" position (FIG. 6) for facilitating interdigitated engagement with locking apertures 86. As will be appreciated, when locking teeth 84 are inserted into locking apertures 86, subsequent longitudinal movement of upper tracks 16 is inhibiting, whereby the seat is releasably locked in a desired horizontally-adjusted position.

According to the particular embodiment shown, latch plate 80 is retained for substantially rectilinear movement along a vertical plane between first and second brackets 100 and 102, respectively. First bracket 100 is a right-angled member having a horizontal surface 104 that is adapted to be secured to an external surface of upper track 16, and a vertical surface 106 that projects inwardly to substantially enclose locking plate 88. First bracket 100 further includes a series of three elongated slots 108 formed in vertical surface 106. Second bracket 102 is laterally-spaced from first bracket 100 and is secured thereto by suitable fasteners, such as rivets 110. In addition, second bracket 102 also includes a series of three elongated slots 112 which are alignable with elongated slots 108 of first bracket 100. Linkage member 82 is pivotably coupled about pivot 114 to a rearward embossed portion 115 on vertical surface 106 of first bracket 100 and includes a slot 116 that is alignable with the central ones of aligned sets of slots 108 and 112.

Latch plate 80 is disposed between first and second brackets 100 and 102, respectively, and includes a pair of transverse pins 118 that are fixed to latch plate 80 so as to extend through the outside ones of slots 108 and 112 formed in first bracket 100 and second bracket 102, respectively. In addition, latch plate 80 also includes an elongated central post 120 that is positioned between transverse pins 118 and which extends through the central ones of the aligned sets of slots 108 and 112 in first and second brackets 100 and 102, respectively, as well as slot 116 in linkage 82. Pins 118 and post 120 have a similar width dimension and are adapted to be guided for smooth rectilinear movement within the above-noted slots in a manner inhibiting rotation of latch plate 80. Thus, latch plate 80 moves along a vertical rectilinear path in response to pivotable movement of handle 20 and linkage 82 about pivot 114. Since slot 116 in linkage 82 is shorter and wider than the aligned series of bracket slots 108 and 112, central post 118 engages a lower end surfaces of slot 116 in response to upward pivotal movement of linkage 82 for moving latch plate 80 to the "released" position of FIG. 7. Likewise, release of handle 20 causes downward pivotal movement of linkage 82 about pivot 114 such that an upper end surface of link slot 116 acts on central post 118 for forcibly urging latch plate 80 toward the "locked" position.

To provide a fail-safe latching arrangement, leaf spring 90 is retained above latch plate 80 to augment the inertial downward locking action of projections 84 within locking apertures 86. In addition, the free ends 122 of leaf spring 90 are slidably disposed in cut-out tabs formed in first bracket 100 such that its central cambered portion 124 is adapted to directly act on latch plate 80 such that central post 120 is urged into engagement with the lower end surface of link slot 116 in the "locked" position. To permit installation of latch mechanism 18 as a sub-assembly, the forward end of linkage 82 can be quickly coupled to the free ends of handle 20 following mounting of horizontal surface 104 on first bracket 100 to an upper planar surface of upper tracks 16. Moreover, since latch plate 80 is enclosed within first bracket 100, the upward linear travel of latch plate 80 is limited below the level of upper track 16 to facilitate utilization of latching mechanisms 18 with various cushion pans and seating arrangements.

Figure 8:
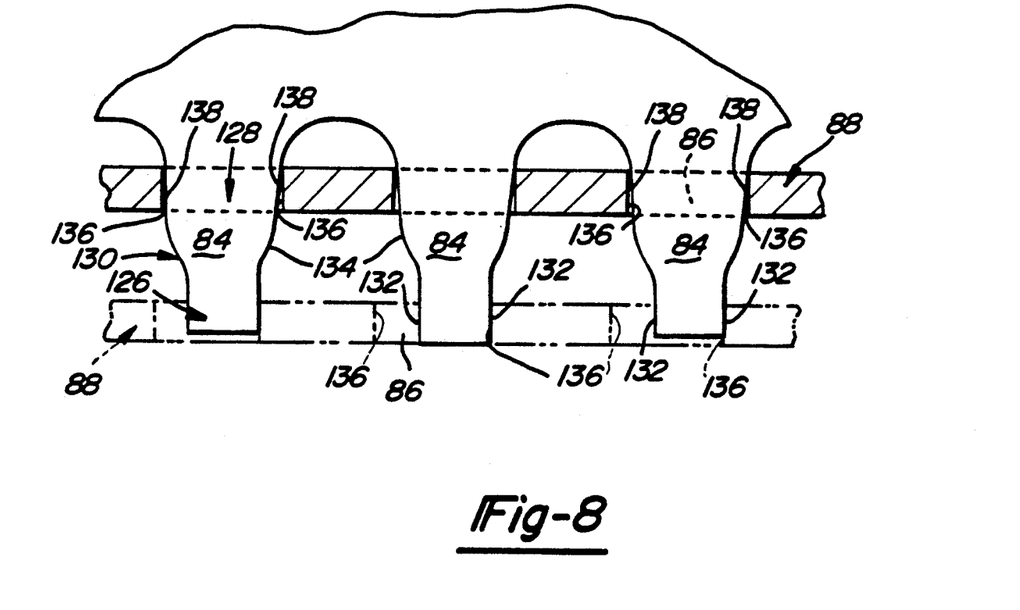
FIG. 8 is an enlarged view of the segmented toothform associated with the improved latching mechanism of the present invention.

With particular reference now to FIG. 8, a segmented toothform for locking teeth 84 is disclosed which is considered to be an improvement over conventional linear or involute tooth forms. In general, locking teeth 84 are symmetrical about their respective centerlines and include a generally "ramped" edge contour for defining a dual-position locking arrangement. More particularly, the segmented toothform for locking teeth 84 includes a first locking portion 126 for facilitating initial receipt within locking apertures 86, a second locking portion 128 for causing complete interdigitated engagement, and a camming portion 130 providing a ramped transition between first and second locking portions 126 and 128, respectively. Thus, the "locked" position for latching mechanisms 18 is actually divide into first and second engagement positions. In the first engagement position, first locking portion 126 is initially interdigitated with locking apertures 86 for defining an "anti-ratcheting" position. Thereafter, slight movement by the seat occupant causes locking teeth 84 to be guided by its ramped transition of camming portion 130 into the second engagement position. Due to complete interdigitated engagement in the second position, chucking movement of the seat is inhibited, thereby defining an "anti-chucking" position. While the center tooth of locking teeth 84 is shown to be slightly longer than the outer teeth, this is considered a design choice for the particular embodiment shown.

First locking portion 126 of segmented teeth 84 is defined by the generally rectangular tip portion thereof and includes linear edge surfaces 132. Preferably, linear edge surfaces 132 are substantially parallel to the centerline of teeth 84. Moreover, the length of linear edge surfaces 132 is selected to extended inwardly from the terminal end of each tooth 84 to a first transition point. More preferably, the width of first locking portion 126 is selected to be smaller (i.e., approximately 50%-75%) than the width of locking apertures 86 for facilitating the first or "anti-ratchet" engagement position (see phantom line position of FIG. 8). Intermediate camming portion 130 interconnects first locking portion 126 to second locking portion 128 and includes a ramped transition surfaces 134 for guiding one set of locking aperture edge surfaces 136 from initial engagement with respective ones of linear edge surfaces 132 (i.e., the "anti-ratchet" position) into complete engagement between both sets of locking aperture edge surfaces 136 with both edge surfaces 138 formed on second locking portion 128. In addition, such "camming" movement, if not immediate, will occur in response to slight movement of the seat. As shown in FIG. 8, camming surfaces 130 extend between the first transition point and a second transition point located at the outer extent of edge surfaces 138. While camming surfaces 130 are shown to be arcuate, it will be appreciated that other profiles (i.e., linear) are contemplated which would likewise provide a suitable camming surface.

According to the preferred embodiment, edge surfaces 138 of second locking portion 128 are linear and slightly tapered relative to the centerline of teeth 84. The back-angled contour for edge surfaces 138 assists in minimizing resistance to movement of latch plate 80 to the "released" position when seat adjustment is desired. Second locking portion 128 terminates at a third transition point with a width dimension that is substantially identical to the overall width of locking apertures 86. As such, a wedging-type frictional contact in the second engagement position acts to inhibit "chucking" movement of the seat. Thus, linear edge surfaces 132 of first locking portion 126 are sized to facilitate initial interdigitation following horizontal seat adjustment to retain the seat in the adjusted position while concurrently inhibiting false latching or "ratcheting" of locking teeth 84 over locking apertures 86.

The foregoing discussion discloses and describes preferred embodiments of a unique interlockingly interfitted track arrangement and a vertical latching mechanism for a seat slide device. However, one skilled in the art will readily recognize from such discussion, and from the accompanying drawings and claims, that various changes, modifications and variations can be made therein without departing from the spirit and scope of the invention as defined in the following claims.

What is claimed is:

1. A seat slide device comprising:
    a lower track;
    an upper track supported for longitudinal movement on said lower track;
    a lock plate fixed to said lower track and having a series of aligned apertures formed therein;
    a latch mechanism mounted to said upper track and including a latch member supported for rectilinear movement along a vertical plane, said latch member having a plurality of locking teeth; and
    manually-operable means for permitting a seat occupant to selectively move said latch member along said vertical plane between a first position wherein said locking teeth are in interdigitated engagement with said apertures and a second position wherein said locking teeth are disengaged from said apertures.

2. The seat slide device of claim 1 wherein said locking teeth have a first locking portion for facilitating initial engagement within said apertures, a second locking portion for lockingly retaining said locking teeth in said apertures, and a camming portion for guiding said teeth from engagement with said first locking portion into engagement with said second locking portion in response to slight movement of said upper track relative to said lower track.

3. The seat slide device of claim 2 wherein said first locking portion is a tip segment of said tooth having lateral edge surfaces that are linear and substantially parallel to a centerline of said tooth, whereby initial engagement between one of said lateral edge surfaces of said tip segment and an edge surface of said aperture acts to inhibit ratcheting of said upper track over said lower track, and wherein said second locking portion is located toward the root of said tooth and has lateral edge surfaces that are adapted to lockingly engage the opposite edge surfaces of said aperture for inhibiting longitudinal chucking movement of said upper track relative to said lower track.

4. The seat slide of claim 3 wherein said camming portion is an intermediate segment of said tooth defining a ramped surface which interconnects said lateral edge surfaces of said first and second locking portions.

5. The seat slide of claim 1 wherein said latch mechanism further includes a first bracket having a first portion secured to said upper track and a second portion overlying and extending toward said lock plate, a second bracket laterally-spaced from said second portion of said first bracket such that said latch member is movably disposed between said second bracket and said second portion of said first bracket, and biasing means acting between said first bracket and said latch member for normally urging said latch member toward said first position.

6. The seat slide of claim 5 wherein said manually-operable means is a handle coupled for pivotable movement to said first bracket, said latch member having post means extending traversely therefrom and which projects into a set of aligned slots formed on each of said handle, said second portion of said first bracket and said second bracket such that pivotable movement of said handle causes rectilinear vertical movement of said latch member.

7. A seat slide device comprising:
    a lower track;
    an upper track supported for longitudinal movement on said lower track; and
    latching means for permitting selective longitudinal movement of said upper track on said lower track, said latching means including a series of apertures formed on said lower track, a latch plate supported from said upper track and having locking teeth formed thereon, and actuation means for moving said latch plate along a vertical plane between a first position wherein said locking teeth are interdigitated with said apertures and a second position wherein said locking teeth are disengaged from said apertures, each of said teeth having a segmented toothform comprising a tip portion for facilitating initial interdigitated engagement with one edge surface of said aperture, a wider root portion for engaging both lateral edges of said aperture, and an intermediate camming portion for guiding the movement of said latch plate between said tip and root portions of said tooth in response to slight movement of said upper track to said lower track with said latch plate in said first position.

8. The seat slide of claim 7 wherein said latching means further includes a first bracket having a first portion secured to said upper track and a second portion overlying and extending toward said locking apertures, a second bracket laterally-spaced from said second portion of said first bracket such that said latch plate is disposed between said second bracket and said second portion of said first bracket, and biasing means acting between said first bracket and said latch plate for normally urging said latch plate toward said first position.

9. The seat slide of claim 8 wherein said actuation means is a handle assembly coupled for pivotable movement to said first bracket, said handle assembly, said second portion of said first bracket and said second bracket each having alignable slots therein, said latch plate having post means extending traversely therefrom which projects into said aligned slots such that pivotable movement of said handle assembly causes rectilinear movement of said latch plate along said vertical plane.

10. A manually-operable vehicle seat adjustment mechanism comprising:
a pair of laterally-spaced lower tracks secured to a reinforced portion of the vehicle;
elongated upper tracks supported for longitudinal movement on said lower tracks; and
a latching arrangement for permitting selective movement of said upper tracks along said lower tracks, said latching arrangement including a series of locking apertures formed on a lock plate fixed to each of said lower tracks, a latch plate supported from each of said upper tracks and having a plurality of locking teeth formed thereon, spring means for biasing said latch plates toward a first position wherein said teeth are interdigitated with said locking apertures for inhibiting longitudinal movement of said upper tracks, a handle coupled to said upper tracks for pivotable movement with respect thereto, and coupling means for coupling said latch plates to said handle for causing rectilinear movement of said latch plates along a vertical plane from said first position toward a second position for disengaging said locking teeth from said locking apertures in response to pivotable movement of said handle in a first direction;
said locking teeth having a segmented toothform including a first locking portion for permitting initial engagement of said teeth within said apertures, a second locking portion for lockingly retaining said teeth within said apertures, and a camming portion located intermediate to said first and second locking portions for guiding the movement of said teeth on said latch plates from engagement with said first locking portion into engagement with said second locking portion in response to slight longitudinal movement of said upper tracks relative to said lower tracks when said latch plates are in said first position.

11. The seat adjustment mechanism of claim 10 wherein said latch arrangement further includes a first bracket secured to said upper track and having a planar segment overlying and extending toward said lock plate, a second bracket laterally-spaced from said planar segment of said first bracket such that said latch plate is disposed between said second bracket and said planar segment of said first bracket for rectilinear movement along said vertical plane, and biasing means acting between said first bracket and said latch plate for normally urging said latch plate toward said first position.

12. The seat adjustment mechanism of claim 11 wherein said handle is coupled for pivotable movement to said first bracket, said handle, said planar segment of said first bracket and said second bracket each including alignable slots formed therein, said latch plates having post means extending traversely therefrom which projects into said aligned slots such that pivotable movement of said handle causes said rectilinear movement of said latch plate.

13. The seat adjustment mechanism of claim 10 wherein said lower tracks have a base segment, a pair of laterally-spaced legs extending from said base segment and first flange means extending outwardly from said legs for defining a first pair of slide channels, and wherein said upper tracks have a planar segment, a pair of side walls extending therefrom, and second flange means extending inwardly from each of said side walls for defining a second pair of slide channels, each of said first slide channels being disposed within one of said second slide channels and each of said second slide channels being disposed within its respective one of said first slide channels for interlockingly interfitting said upper track on said lower track.

14. The seat adjustment mechanism of claim 13 further comprising slide means disposed between said interlocking interfitted tracks for supporting said upper tracks for sliding movement on said lower tracks, said slide means including first roller means rollingly disposed between said base segment of said lower track and said planar segment of said upper track, and second roller means disposed in each of said second slide channels between said first and second flange means.

15. The seat adjustment mechanism of claim 14 wherein said slide means is a retainer assembly having a body member configured to include a central portion and a pair of transversely extending legs, said legs terminating in an inwardly rolled lip having openings for retaining said second roller means therein, said central portion having a cut-out within which said first roller means is retained.

16. A seat slide device comprising:
a lower track having a base segment and a first pair of inverted generally U-shaped flanges which extend outwardly from said base segment, each of said first pair of flanges defining laterally spaced vertical portions with the inner one of said vertical portions being connected to said base segment and the outer one of said vertical portions having a distal end portion that is angularly directed inwardly toward said inner vertical portion;
an upper track supported for longitudinal movement on said lower track and having a planar segment and a second pair of generally U-shaped flanges which extend inwardly from said planar segment, each of said second pair of flanges defining laterally spaced vertical segments with the outer one of said vertical segments being connected to said planar segment and the inner one of said vertical segments having a distal end portion that is angularly directed outwardly toward said outer vertical segment; said first and second pairs of flanges being interfitted relative to each other for interlocking said upper track to said lower track; and
slide means disposed between said interlocked tracks for supporting said upper track for sliding movement on said lower track while transferring loads exerted on said upper track to said lower track.

17. The seat slide of claim 16 wherein the distal end portions of said first pair of flanges are in overlapping relation to the distal end portions of said second pair of flanges.

18. The seat slide of claim 17 wherein said slide means includes first support means rollingly disposed between the base segment of said lower track and the planar segment of said upper track, and second support means disposed within slide channels formed by said second pair of flanges and in rolling engagement with said angulated distal end portions of said first pair of flanges.

19. The seat slide of claim 18 wherein said slide means further includes a retainer assembly having a body member configured to include a central portion and a pair of transversely extending legs, said legs terminating in an inwardly rolled lip and having openings formed therein for retaining said second support means therein, said central portion having a cut-out segment within which said first support means is rollingly retained.

20. The seat slide of claim 19 wherein said first support means comprises a cylindrical roller positioned in rolling engagement with said base segment of said lower track and said planar segment of said upper track for transferring downwardly-directed loading from said upper track into said lower track.

21. The seat slide of claim 19 wherein said second support means includes a plurality of ball bearings rollingly retained within said openings in said rolled lips of said legs on said retainer body, said ball bearings being disposed within said slide channels defined by said second flanges of said upper track such that each of said ball bearings engages said angulated distal end portion of one of said first pair of flanges and an arcuate surface connecting said outer vertical segment to a horizontal lower segment interconnecting the vertical segments of one of said second pair of flanges on said upper track.

22. A seat slide device comprising:
a lower track having a base segment and a first pair of inverted generally U-shaped flanges which extend outwardly from said base segment, each of said first pair of flanges defining laterally spaced vertical portions with the inner one of said vertical portions being connected to said base segment and the outer one of said vertical portions having a distal end portion that is angularly directed inwardly toward said inner vertical portion;
an upper track supported for longitudinal movement on said lower track and having a planar segment and a second pair of generally U-shaped flanges which extend inwardly of said planar segment, each of said second pair of flanges defining laterally spaced vertical segments and a generally horizontal lower segment; said first and second pairs of flanges being interfitted relative to each other for interengaging said upper track to said lower track; and
slide means disposed between said interengaged tracks for supporting said upper track for sliding movement on said lower track while transferring loads exerted on said upper track to said lower track, said slide means including first roller means disposed within slide channels formed by said second flanges and in rolling engagement with said angulated distal end portions of said first pair of flanges and arcuate surfaces interconnecting said horizontal lower segments with said outer vertical segments of said second pair of flanges.

23. The seat slide of claim 22 wherein the inner vertical segments of each of said second pair of flanges have distal end portions that are angularly directed outwardly toward their respective outer vertical segments such that the distal end portions of said first pair of flanges are in overlapping relation to the distal end portions of said second pair of flanges.

24. The seat slide of claim 23 wherein said slide means further includes second roller means rollingly disposed between said base segment of said lower track and said planar segment of said upper track.

25. The seat slide of claim 24 wherein said slide means further includes a retainer assembly having a body member configured to include a central portion and a pair of transversely extending legs, said legs terminating in an inwardly rolled lip having openings for retaining said first roller means therein, said central portion having a cut-out within which said second roller means is retained.

* * * * *